(12) United States Patent
Schmidt et al.

(10) Patent No.: US 8,360,195 B2
(45) Date of Patent: Jan. 29, 2013

(54) VEHICLE STEERING SYSTEM

(75) Inventors: Klemens Schmidt, Gerbrunn (DE); Udo Herth, Mücke-Sellnrod (DE)

(73) Assignee: Aktiebolaget SKF, Göteborg (SE)

( * ) Notice: Subject to any disclaimer, the term of this patent is extended or adjusted under 35 U.S.C. 154(b) by 238 days.

(21) Appl. No.: 12/742,168

(22) PCT Filed: Nov. 5, 2008

(86) PCT No.: PCT/EP2008/009303
§ 371 (c)(1),
(2), (4) Date: Aug. 25, 2010

(87) PCT Pub. No.: WO2009/059746
PCT Pub. Date: May 14, 2009

(65) Prior Publication Data
US 2010/0307858 A1    Dec. 9, 2010

(30) Foreign Application Priority Data

Nov. 10, 2007 (DE) .................. 10 2007 053 694

(51) Int. Cl.
*B62D 5/06* (2006.01)
(52) U.S. Cl. ............................ 180/422; 180/443
(58) Field of Classification Search ............. 180/422, 180/443, 441, 442, 415
See application file for complete search history.

(56) References Cited

U.S. PATENT DOCUMENTS

| | | | |
|---|---|---|---|
| 55,030 A * | 5/1866 | Thomson ........................ | 418/37 |
| 5,285,867 A | 2/1994 | Pedersen et al. | |
| 6,933,333 B2 * | 8/2005 | Clulow et al. ................ | 523/468 |
| 2004/0254294 A1 * | 12/2004 | Clulow et al. ................ | 524/599 |
| 2009/0310694 A1 * | 12/2009 | Oh ................ | 375/260 |
| 2011/0166717 A1 * | 7/2011 | Yasugi ........................ | 700/287 |

FOREIGN PATENT DOCUMENTS

| | | |
|---|---|---|
| DE | 4025697 A1 | 2/1992 |
| DE | 4418118 C1 | 7/1995 |
| DE | 19911892 A1 | 9/2000 |
| GB | 2351953 A | 1/2001 |
| WO | WO2005054034 A1 | 6/2005 |

* cited by examiner

*Primary Examiner* — Tashiana Adams
(74) *Attorney, Agent, or Firm* — Mark A. Ussai; Bryan Peckjian

(57) ABSTRACT

The invention relates to a vehicle steering system having a hydraulic actuator (13) for generating a steering movement, a rotary hydraulic valve (4) for hydraulically controlling the hydraulic actuator (13), a first electronic drive (7) for actuating the hydraulic valve (4) and a first coupling element (8) for transmitting torque from the first electronic drive (7) to the hydraulic valve (4) and for preventing a transmission of torque from the hydraulic valve (4) to the first electronic drive (7).

20 Claims, 1 Drawing Sheet

VEHICLE STEERING SYSTEM

CROSS-REFERENCE

This application is the U.S. national stage filing of International Application No. PCT/EP2008/009303 filed Nov. 5, 2008, which claims priority to German patent application no. 10 2007 053 694.3 filed Nov. 10, 2007.

TECHNICAL FIELD

The invention relates to a vehicle steering system that generates a steering movement based upon electronic signals.

RELATED ART

Such a steering system is known from GB 2 351 953 B. A steer-by-wire system is disclosed therein, wherein an electronic signal is transmitted from a steering wheel to an actuator. The actuator generates a steering force as a function of the electronic signal. Further, the steering wheel is connected with a resistance element, with which a variable moment of resistance that acts on the steering wheel can be generated. The resistance element has an electrorheological and/or magnetorheological fluid.

SUMMARY

It is an object of the invention to construct a vehicle steering system, which generates a steering movement based upon an electronic signal, having a relatively low complexity so that a higher safety standard is ensured.

In one aspect of the present teachings, a vehicle steering system includes a hydraulic actuator for generating a steering movement, a rotary hydraulic valve for hydraulically controlling the hydraulic actuator, a first electronic drive for actuating the hydraulic valve as well as a first coupling element for transmitting torque from the first electronic drive to the hydraulic valve and for preventing a transmission of torque from the hydraulic valve to the first electronic drive.

The hydraulic valve of the inventive steering system can also produce a pumping force, i.e. the hydraulic valve can also involve a pump. For linguistic simplification, however, the term "hydraulic valve" will be utilized throughout in the following, wherein the pump effect should be encompassed therein. In the context of the invention, the term "hydraulic valve" is thus utilized as an abbreviated notation for the comprehensive term "hydraulic valve and/or hydraulic pump".

The invention has the advantage that a higher safety standard is achievable with a relatively low complexity. In particular, the fact that merely a single hydraulic valve is necessary in the inventive steering system contributes thereto. Moreover, by using the coupling element, it is ensured that the hydraulic valve is not disabled if the first electronic drive malfunctions, so that the possibility exists to actuate the hydraulic valve in another way. As a result of this, at least a provisional steerability of the vehicle can also be ensured if the first electronic drive malfunctions.

It is particularly advantageous when a second electronic drive for operating the hydraulic valve and a second coupling element for transmitting torque from the second electronic drive to the hydraulic valve and for preventing a transmission of torque from the hydraulic valve to the second electronic drive are provided in the inventive steering system. Then, a malfunction of the first electronic drive can be compensated by the second electronic drive so that the steerability of the vehicle is not impaired.

The first coupling element can be constructed for a transmission of torque from the first electronic drive to the hydraulic valve in both rotational directions and for preventing a transmission of torque from the hydraulic valve to the first electronic drive in both rotational directions and/or the second coupling element can be constructed for a transmission of torque from the second electronic drive to the hydraulic valve in both rotational directions and for preventing a transmission of torque from the hydraulic valve to the second electronic drive in both rotational directions.

A manually-actuatable transducer device can be provided in the inventive steering system, with which the first electronic drive and/or the second electronic drive is/are controllable. In particular, the transducer device can be constructed as a steering wheel. In this case, the operation of the inventive steering system takes place in the same way as the operation of a conventional steering system so that no adjustment for the vehicle driver is required when changing-over to the inventive steering system.

The inventive steering system can include a sensor that generates a signal as a function of the actuation of the transducer device. Further, the inventive steering system can include a control apparatus for electronically controlling the first electronic drive and/or the second electronic drive as a function of the signal from the sensor.

The transducer device can be constructed as a component of a manually-actuatable, mechanical drive for actuating the hydraulic valve. This design has the advantage that, when no second electronic drive is present, the vehicle remains steerable even if the first electronic drive malfunctions. For example, a steering arm can be provided as a further component of the mechanical drive for actuating the hydraulic drive.

The inventive steering system can include a first transmission for increasing the torque of the first electronic drive and/or a second transmission for increasing the torque of the second electronic drive. This makes possible a relatively small dimensioning of the first and/or second electronic drive in view of the torque, so that the first and/or second electronic drive can be constructed in a compact manner and is/are available in a cost-effective manner.

The first electronic drive and/or the second electronic drive can be constructed as a separate component with respect to the hydraulic valve. This makes possible the usage of cost-effective standard designs for the first and/or second electronic drive. Moreover, the possibility thereby opens up to redundantly design the first electronic drive in a simple way and to forgo redundancy in the hydraulic valve. In particular, the first electronic drive and/or the second electronic drive can be constructed as an electric motor. In addition, the possibility exists that the first electronic drive and the second electronic drive are constructed in an identical manner.

The hydraulic valve can be constructed as a pump for generating a pressure in the hydraulic fluid that is converted into a steering movement by the hydraulic actuator. In this way, for example, the functionality of the steering system can be maintained even if the intrinsic hydraulic pump breaks down.

The inventive steering system can be constructed so that the hydraulic valve is provided as the sole component for generating a pressure in the hydraulic fluid that is converted into a steering movement by the hydraulic actuator. This variant has the advantage that a separate hydraulic pump is not necessary.

The invention will be explained hereinafter with the assistance of exemplary embodiments illustrated in the drawings.

DETAILED DESCRIPTION OF THE INVENTION

Figure 1:
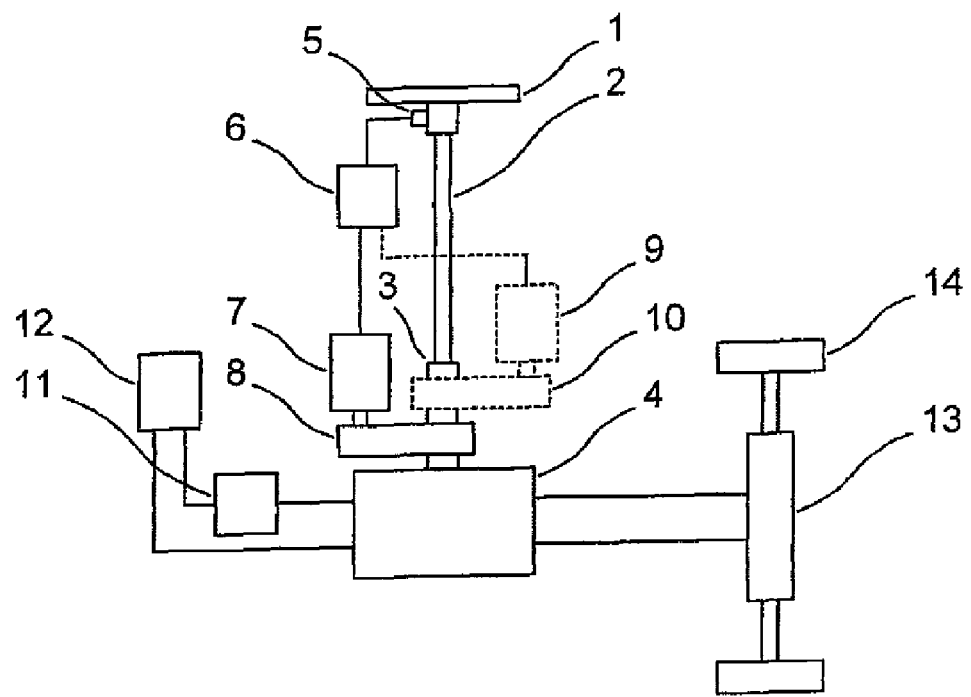
FIG. 1 shows a first exemplary embodiment of an inventively-constructed steering system of a vehicle in a schematic block diagram and FIG. 2 shows a second exemplary embodiment of the inventive steering system in a diagram corresponding to FIG. 1.

FIG. 1 shows a first exemplary embodiment of an inventively-constructed steering system of a vehicle in a schematic block diagram. In particular, the vehicle can involve a commercial vehicle that is operated outside of public traffic, for example, a construction vehicle, an agricultural vehicle, a fork-lift, etc.

The steering system includes a steering wheel 1 that is mechanically coupled with a shaft 3 of a rotary hydraulic valve 4 via a steering arm 2. As will be described further below, the rotary hydraulic valve 4 can also produce a pumping force, i.e. the rotary hydraulic valve 4 can involve a pump. For linguistic simplification, however, the term "hydraulic valve" will be used throughout in the following, wherein the pump effect should be encompassed therein. The mechanical coupling of the steering wheel 1 with the shaft 3 can be effected, e.g., by a rigid connection or by a not-illustrated steering transmission. A sensor 5 is disposed in the area of the steering wheel 1; the sensor 5 outputs at its output a signal as a function of the rotational movement, in particular the rotational speed and the rotational direction, of the steering wheel 1. The sensor 5 can also be constructed so that it outputs a signal as a function of the rotational angle of the steering wheel 1. It is also possible as well that the sensor 5 outputs a signal that is a function of the rotational angle and the rotational speed of the steering wheel 1.

The output of the sensor 5 is electrically-conductively connected with an input of the control apparatus 6, so that the signal output by the sensor 5 is fed into the control apparatus 6. A first output of the control apparatus 6 is electrically-conductively connected with a first electronic drive 7. The first electronic drive 7 is coupled with the shaft 3 of the hydraulic valve 4 via a first coupling element 8. As is indicated by the dotted lines, a second output of the control apparatus 6 can be electrically-conductively connected with an optionally-provided second electronic drive 9. The second electronic drive 9 is coupled with the shaft 3 of the hydraulic valve 4 via an optionally-provided second coupling element 10. The second electronic drive 9 can be constructed in an identical manner as the first electronic drive 7. The second coupling element 10 can, as well, be constructed in an identical manner as the first coupling element 8.

The hydraulic valve 4 is hydraulically connected with a hydraulic pump 11 that is connected to a reservoir 12 for hydraulic fluid. The hydraulic valve 4 is connected to the reservoir 12 as well.

Further, the hydraulic valve 4 is hydraulically connected with a hydraulic actuator 13. The hydraulic actuator 13 acts upon steerable wheels 14 of the vehicle.

When the vehicle driver initiates a steering maneuver, in which he rotates the steering wheel 1 away from the middle position, the sensor 5 outputs signals to the control apparatus 6; the signals are a function of the rotational angle and/or the rotational speed of the steering wheel 1. The control apparatus 6 generates control signals for the first electronic drive 7 based upon the signals of the sensor 5. The first electronic drive 7 can be constructed, e.g., as an electric motor, in particular as a rotating motor, whose rotating speed is controlled by the control apparatus 6. In addition or in the alternative thereto, the rotational angle or the actuation time of the first electronic drive 7 can be controlled by the control apparatus 6. In this case, the respective rotational direction of the first electronic drive 7 is also prescribed by the control apparatus 6. The rotational direction can be determined, e.g., by the polarity of the voltage applied to the first electronic drive 7.

The torque generated by the first electronic drive 7 is transmitted to the shaft 3 of the hydraulic valve 4 via the first coupling element 8. The shaft 3 of the hydraulic valve 4 can be rotationally displaced thereby, wherein the direction of the rotational movement is prescribed by the direction of the torque. The amount of the torque can be adjusted via a not-illustrated transmission that can be disposed between the first electronic drive 7 and the shaft 3 of the hydraulic valve 4.

The first coupling element 8 is constructed so that it carries out a transmission of torque exclusively from the first electronic drive 7 to the shaft 3 of the hydraulic valve 4 and not from the shaft 3 of the hydraulic valve 4 to the first electronic drive 7. In particular, the first coupling element 8 acts as a free wheel in the direction from the shaft 3 of the hydraulic valve 4 to the first electronic drive 7. In this way, it is prevented that the shaft 3 of the hydraulic valve 4 is disabled if the first electronic drive 7 is shut-off or if there is a defect in the first electronic drive 7. Consequently, the hydraulic valve 4 is functional also in such a situation. The transmission of torque from the first electronic drive 7 to the shaft 3 of the hydraulic valve 4 can take place in both directions.

The hydraulic valve 4 controls the supply of hydraulic fluid to the hydraulic actuator 13 and the drainage of hydraulic fluid from the hydraulic actuator 13, respectively. In the illustrated exemplary embodiment, the hydraulic valve 4 is connected with the hydraulic actuator 13 via two hydraulic conduits. The two hydraulic conduits can discharge into respective hydraulic chambers of the hydraulic actuator 13; the chambers are separated from each other by a linearly-moving piston. The movement of the piston is transmitted to the wheels 14. The movement direction of the piston and thus the direction of the steering impulse depends upon to which of the two hydraulic chambers of the hydraulic actuator 13 hydraulic fluid is supplied. The supply of the hydraulic fluid, in turn, depends on the rotational direction of the shaft 3 of the hydraulic valve 4.

In a first rotational direction of the shaft 3 of the hydraulic valve 4, hydraulic fluid is conveyed to one of the two hydraulic chambers of the hydraulic actuator and thus, the piston of the hydraulic actuator 13 moves in a first direction. The leads to a steering impulse of the wheels 14 in a first steering direction.

In an opposite rotational direction of the shaft 3 of the hydraulic valve 4, hydraulic fluid is conveyed to the other hydraulic chamber of the hydraulic actuator 13 and thus, the piston of the hydraulic actuator 14 moves in a direction opposite to the first direction. This leads to a steering impulse in a steering direction that is opposite to the first steering direction.

When the shaft 3 of the hydraulic valve 4 stands still, the flow of the hydraulic fluid comes to a standstill and the piston of the hydraulic actuator 13 remains in its current position so that the steering impulse is maintained in an unchanged manner.

The pressure necessary for conveying the hydraulic fluid into the hydraulic chambers of the hydraulic actuator 13 is generated by the hydraulic pump 11. If the hydraulic pump 11 breaks down, the pressure necessary for conveying the hydraulic fluid into the hydraulic chambers of the hydraulic actuator 13 can also be generated by the hydraulic valve 4. Thus, the steerability of the vehicle is maintained even if the hydraulic pump 11 breaks down.

In the same way as described for the first electronic drive 7, a steering impulse can also be generated by the second electronic drive 9. As long as the first electronic drive 7 is functional, the second electronic drive 9 is generally not actuated. Only after the first electronic drive 7 breaks down is the second electronic drive 9 actuated as a replacement. A high level of safety is achieved by this redundancy.

Instead of the alternative actuation, a simultaneous actuation of the two electronic drives 7, 9 is also possible. In this case, the breakdown of one of the electronic drives 7, 9 causes the hydraulic valve 4 to be operated entirely by the respective other electronic drive 7, 9.

In the exemplary embodiment of the steering system illustrated in FIG. 1, the turning of the steering wheel results not only in the generation of a sensor signal and an actuation of the hydraulic valve 4 based thereupon by the first electronic drive 7 and/or the second electronic drive 9, but also of a mechanical actuation of the hydraulic valve 4 via the steering arm 2. This means that, in case of a failure and even in case of a disabling of the first electronic drive 7 and/or the second electronic drive 9, the hydraulic valve 4 can be manually actuated via the steering wheel 1 and consequently, the vehicle remains steerable. In the exemplary embodiment illustrated in FIG. 1, a high level of safety is thus achieved even if the optional second electronic drive 9 is omitted.

Figure 2:
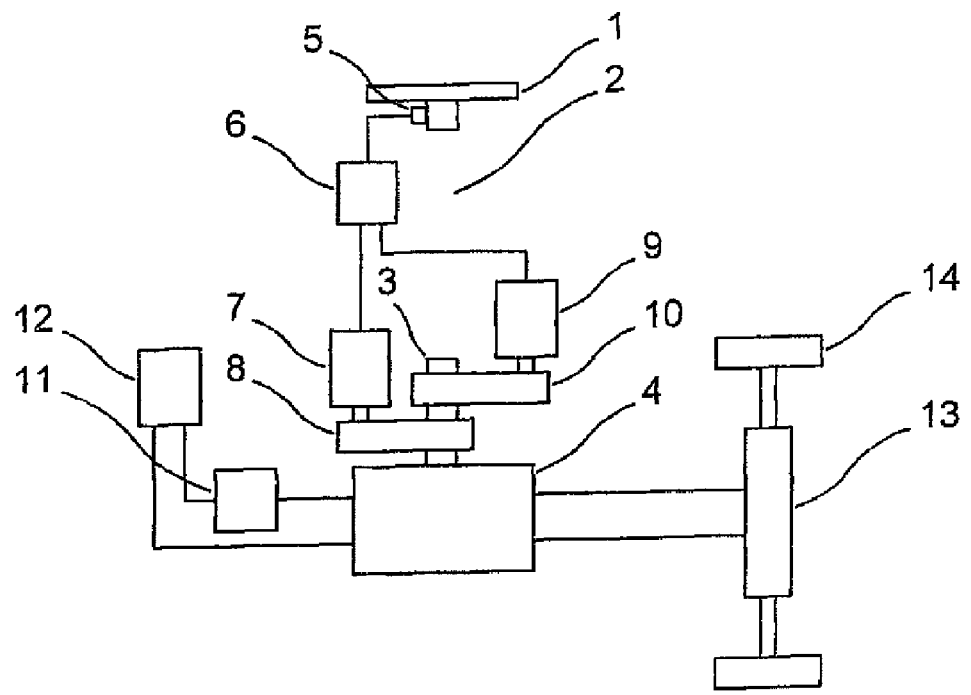

FIG. 2 shows a second exemplary embodiment of the inventive steering system in an illustration corresponding to FIG. 1. This second exemplary embodiment differs from the first exemplary embodiment illustrated in FIG. 1 in that no steering arm 2 is provided which mechanically connects the steering wheel 1 with the hydraulic valve 4 and in that the second electronic drive 9 and the second coupling element 10 are not optional, but are provided in a standard manner. As to the rest, the exemplary embodiments illustrated in FIGS. 1 and 2 coincide in their structural compositions.

The exemplary embodiment of the steering system illustrated in FIG. 2 also functionally coincides, in essence, with the exemplary embodiment according to FIG. 1. One difference consists merely in that a mechanical actuation of the hydraulic valve 4 by the steering wheel 1 is not possible, because no mechanical coupling between the steering wheel 1 and the hydraulic valve 3 is present. This means that, in the exemplary embodiment of FIG. 2, it involves a pure steer-by-wire system. For reasons of safety, the second electronic drive 9 is therefore mandatorily provided in the exemplary embodiment according to FIG. 2. A redundancy is produced by the second electronic drive 9 that ensures a steerability of the vehicle even if the first electronic drive 7 breaks down.

The omitted mechanical coupling between the steering wheel 1 and the hydraulic valve 4 makes possible an arbitrary positioning of the steering wheel 1. Moreover, it is also possible to design the steering wheel 1 in a detachable manner so that it can be, e.g., disposed at different positions and thus it still ensures a steerability of the vehicle in each position. Further, the possibility exists to replace the steering wheel 1 with a differently-constructed component that generates a sensor signal, which is analyzable by the control apparatus 6 in cooperation with the sensor 5. This differently-constructed component can, in particular, be designed in a more compact manner than the steering wheel 1.

In a modification of the steering system, a plurality of hydraulic actuators 13 is provided instead of the single hydraulic actuator 13. These hydraulic actuators 13 can have a simpler composition than the hydraulic actuator 13 that is utilized in the exemplary embodiments according to FIGS. 1 and 2.

Further, the possibility exists to design the hydraulic valve 4 and the first electronic drive 7, as well as if necessary the second electronic drive 9, so that they possess a sufficient capacity for generating the pressure in the hydraulic fluid necessary for the actuation of the hydraulic actuator 13 by the hydraulic valve 4. In this modification, the steering system is entirely functional also without the hydraulic pump 11, so that the hydraulic pump 11 can be omitted.

REFERENCE NUMBER LIST

1 Steering wheel
2 Steering arm
3 Shaft
4 Hydraulic valve
5 Sensor
6 Control apparatus
7 First electronic drive
8 First coupling element
9 Second electronic drive
10 Second coupling element
11 Hydraulic pump
12 Reservoir
13 Hydraulic actuator
14 Wheel

The invention claimed is:

1. A vehicle steering system comprising:
a hydraulic actuator for generating a steering movement,
a rotary hydraulic valve for hydraulically controlling the hydraulic actuator,
a first electronic drive for actuating the rotary hydraulic valve and
a first coupling element for rotationally coupling together the first electronic drive and the rotary hydraulic valve, wherein, when rotationally coupling together the first electronic drive and the rotary hydraulic valve, the first coupling element both transmits torque from the first electronic drive to the rotary hydraulic valve and prevents a transmission of torque from the rotary hydraulic valve to the first electronic drive.

2. A vehicle steering system according to claim 1, further comprising:
a second electronic drive for actuating the rotary hydraulic valve and
a second coupling element for transmitting torque from the second electronic drive to the rotary hydraulic valve and for preventing a transmission of torque from the rotary hydraulic valve to the second electronic drive.

3. A vehicle steering system according to claim 2, wherein the first coupling element is configured to transmit torque from the first electronic drive to the rotary hydraulic valve in both rotational directions and to prevent a transmission of torque from the rotary hydraulic valve to the first electronic drive in both directions and the second coupling element is configured to transmit torque from the second electronic drive to the rotary hydraulic valve in both rotational directions and to prevent a transmission of torque from the rotary hydraulic valve to the second electronic drive in both rotational directions.

4. A vehicle steering system according to claim 1, further comprising a manually-actuatable transducer device configured to control the first electronic drive.

5. A vehicle steering system according to claim 4, wherein the transducer device comprises a steering wheel.

6. A vehicle steering system according to claim 5, further comprising a sensor configured to generate signals as a function of the actuation of the steering wheel.

7. A vehicle steering system according to claim 6, further comprising a control apparatus configured to receive the signals generated by the sensor and to electronically control the first electronic drive as a function of the signals from the sensor.

8. A vehicle steering system according to claim 4, wherein the transducer device is a component of a manually-actuatable, mechanical drive for actuating the rotary hydraulic valve.

9. A vehicle steering system according to claim 8, wherein the mechanical drive for actuating the hydraulic valve further comprises a steering arm.

10. A vehicle steering system according to claim 2, further comprising:
a first transmission configured to increase the torque output from the first electronic drive, or a second transmission configured to increase the torque output from the second electronic drive, or both.

11. A vehicle steering system according to claim 2, wherein the first electronic drive is constructed as a separate component from the rotary hydraulic drive, or the second electronic drive is constructed as a separate component from the rotary hydraulic valve, or both.

12. A vehicle steering system according to claim 2, wherein the first electronic drive comprises an electric motor, or the second electronic drive comprises an electric motor, or both.

13. A vehicle steering system according to claim 1, wherein the rotary hydraulic valve comprises a pump for generating a pressure in the hydraulic fluid and the hydraulic actuator is configured to convert changes in the pressurized hydraulic fluid into a steering movement.

14. A vehicle steering system according to claim 13, wherein the rotary hydraulic valve is the sole component in the vehicle steering system configured to generate the pressurized hydraulic fluid.

15. A vehicle steering system comprising:
a hydraulic actuator having an output mechanically coupled to at least one vehicle wheel, the hydraulic actuator being configured to apply a steering force to the at least one vehicle wheel,
a rotary hydraulic valve configured to supply pressurized hydraulic fluid to the hydraulic actuator,
a first electric motor configured to actuate the rotary hydraulic valve and
a first coupler configured to rotationally couple together the rotary hydraulic valve and the first electric motor, wherein, when the first coupler rotationally couples together the rotary hydraulic valve and the first electric motor, the first coupler is configured to transmit a torque from the first electric motor to the rotary hydraulic valve and to prevent torque from being transmitted from the rotary hydraulic valve back to the first electric motor.

16. A vehicle steering system according to claim 15, further comprising:
a second electric motor configured to actuate the rotary hydraulic valve and
a second coupler configured to transmit a torque from the second electric motor to the rotary hydraulic valve and to prevent torque from being transmitted from the rotary hydraulic valve back to the second electric motor, the second electric motor and second coupler acting in parallel to the first electric motor and the first coupler.

17. A vehicle steering system according to claim 16, further comprising:
a manually-actuatable transducer device and
a sensor configured to generate signals as a function of the actuation of the transducer device, the signals being electronically coupled to the first electric motor to control an output the first electric motor.

18. A vehicle steering system according to claim 17, wherein the transducer device comprises a steering wheel and the vehicle steering system further comprises a steering arm mechanically coupling the steering wheel at least to the first coupler.

19. A vehicle steering system according to claim 18, wherein the rotary hydraulic valve comprises a pump configured to pressurize the hydraulic fluid and the hydraulic actuator is configured to convert changes in the pressurized hydraulic fluid into the steering force.

20. A vehicle steering system according to claim 15, further comprising:
a steering wheel,
a sensor configured to generate signals as a function of rotation of the steering wheel, the signals being electronically coupled to the first electric motor to control an output the first electric motor that is mechanically coupled to the rotary hydraulic device via the first coupler and
a steering arm mechanically coupling the steering wheel at least to the first coupler.

* * * * *